(12) United States Patent
Wagner

(10) Patent No.: US 12,480,323 B1
(45) Date of Patent: Nov. 25, 2025

(54) POOL CAP

(71) Applicant: Todd Raymond Wagner, Las Vegas, NV (US)

(72) Inventor: Todd Raymond Wagner, Las Vegas, NV (US)

( * ) Notice: Subject to any disclaimer, the term of this patent is extended or adjusted under 35 U.S.C. 154(b) by 57 days.

(21) Appl. No.: 18/526,508

(22) Filed: Dec. 1, 2023

Related U.S. Application Data

(63) Continuation-in-part of application No. 17/540,970, filed on Dec. 2, 2021, now Pat. No. 11,873,656.

(60) Provisional application No. 63/121,235, filed on Dec. 3, 2020.

(51) Int. Cl.
*E04H 4/06* (2006.01)
*E04H 4/08* (2006.01)

(52) U.S. Cl.
CPC ..................... *E04H 4/08* (2013.01)

(58) Field of Classification Search
CPC .. E04H 4/06; E04H 4/14; E04H 4/106; E04H 4/108; B63C 2009/265; A47K 3/001; A47K 3/003; A01K 29/00
USPC .................. 119/245, 246, 253, 269
See application file for complete search history.

(56) References Cited

U.S. PATENT DOCUMENTS

| | | | | |
|---|---|---|---|---|
| 4,369,109 A * | 1/1983 | Edge | ..................... | B01D 29/96 210/462 |
| 4,379,351 A * | 4/1983 | Hinsperger | ............... | E04H 4/16 4/498 |
| 4,541,655 A * | 9/1985 | Hunter | ................... | F16L 13/161 285/55 |
| 5,249,315 A * | 10/1993 | Moylan | .................. | A47K 3/001 4/577.1 |
| 5,705,058 A * | 1/1998 | Fischer | ................. | E04H 4/1263 210/242.1 |
| 6,161,988 A * | 12/2000 | Pawluk | .................. | A63B 47/02 405/74 |
| 6,306,295 B1 * | 10/2001 | Giacalone | ................. | E04H 4/14 210/167.2 |
| 6,321,689 B1 * | 11/2001 | Fulmer | .................. | A01K 29/00 441/83 |
| 6,722,307 B1 * | 4/2004 | Rogers | ................... | A01K 1/035 182/206 |

(Continued)

FOREIGN PATENT DOCUMENTS

CN 206315430 U * 7/2017 ............... A63B 5/11

*Primary Examiner* — Erin Deery
(74) *Attorney, Agent, or Firm* — QuickPatents, Inc.; Kevin Prince

(57) ABSTRACT

The present invention is an animal barrier for use proximate bodies of water such as pools, ponds, fountains or hot tubs. The barrier comprises elongated, malleable frame members, each having opposing ends and protrusions projecting laterally therefrom. A flexible web conforms and affixes to the frame members, held thereto at the protrusions by friction. The malleable frame members are bent to suit water feature shapes, allowing customization. The elongated frame members connect using linear union connectors coaxially joining the ends, and L-connectors orthogonally joining the ends, together forming a malleable barrier frame. The frame is placed about the body of water, forming the customizable animal barrier preventing access, while allowing water flow. The malleable frame members and customization allow adaptation to various water feature spillway designs.

14 Claims, 8 Drawing Sheets

(56) References Cited

U.S. PATENT DOCUMENTS

2003/0140794 A1\* 7/2003 Wang ................. B01D 39/1676
96/226

\* cited by examiner

POOL CAP

CROSS-REFERENCE TO RELATED APPLICATIONS

This application is a Continuation-in-Part of U.S. patent application Ser. No. 17/540,970, filed on Dec. 2, 2021, which itself claimed the benefit of U.S. Provisional Patent Application 63/121,235, filed on Dec. 3, 2020, both being incorporated herein by reference.

STATEMENT REGARDING FEDERALLY SPONSORED RESEARCH AND DEVELOPMENT

Not Applicable.

FIELD OF THE INVENTION

This invention relates to animal barriers, and more particularly to customizable animal barriers fitted for bodies of water.

BACKGROUND

Most people who own hot tubs or fountains with spillways into the main pool know how difficult it is to keep animals out of their water features. These people either have to put up with unwanted animals drinking out of their water features, or they have to set up a barrier of some kind. But these barriers typically prevent water from flowing freely from a hot tub or fountain to the connected pool, or they are awkward and don't fit their specific spillway, allowing animals to get around them and still get to the water.

Therefore, there is a need for a device that simultaneously allows water to pass freely from the hot tub or fountain spillway into the main pool and prevent animals from circumventing the barrier. The barrier must also be customizable for each person's specific hot tub or fountain spillways. The present invention accomplishes these objectives.

SUMMARY OF THE INVENTION

The present invention is an animal barrier for use proximate a body of water such as a pool, pond, fountain or hot tub. The animal barrier comprises a plurality of elongated, malleable frame members, each having two opposing ends. The malleable frame members can be bent to suit the shape of the body of water and elements therearound, allowing the barrier to be customized.

The elongated, malleable frame members have a plurality of protrusions projecting laterally away therefrom. A flexible web is adapted for fixing with two or more of the frame members. The flexible web is cut to conform to the frame members and held thereto at the protrusions at least partially by friction. This allows the flexible web to be secured to the barrier frame.

The elongated frame members can be connected together using a plurality of linear union connectors to coaxially connect the ends, and a plurality of L-connectors to orthogonally connect the ends. Together, the elongated frame members and connectors form a malleable barrier frame that can be placed about the body of water to form the customizable animal barrier.

The present device simultaneously allows water to pass freely from the hot tub or fountain spillway into the main pool and prevent animals from circumventing the barrier. The barrier is also customizable for each person's specific hot tub or fountain spillway design due to the malleable frame members and the variety of connectors. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1A:
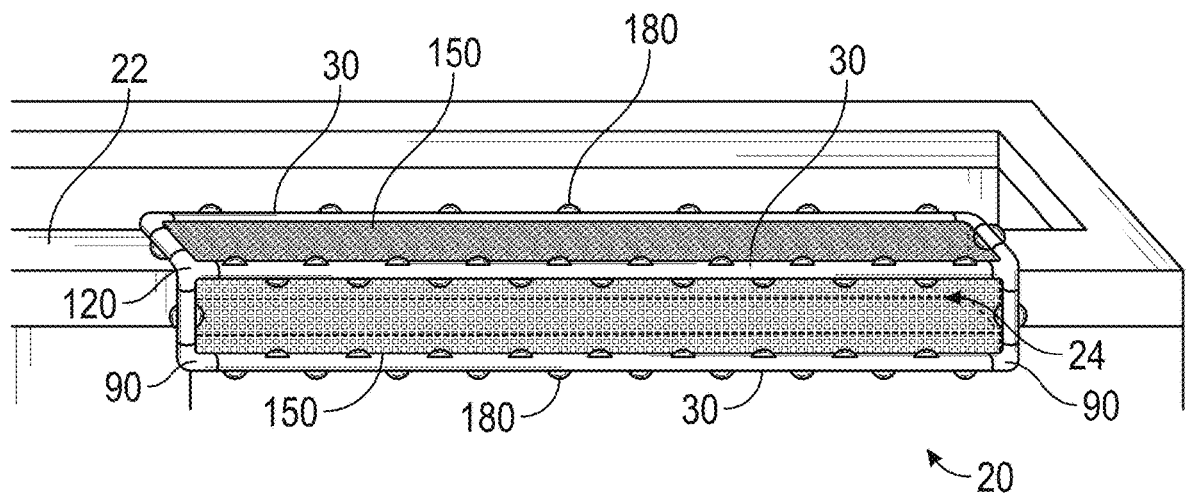
FIG. 1A is a perspective view of the claimed invention in use on a water spillway between a spa and a pool.
Figure 1B:
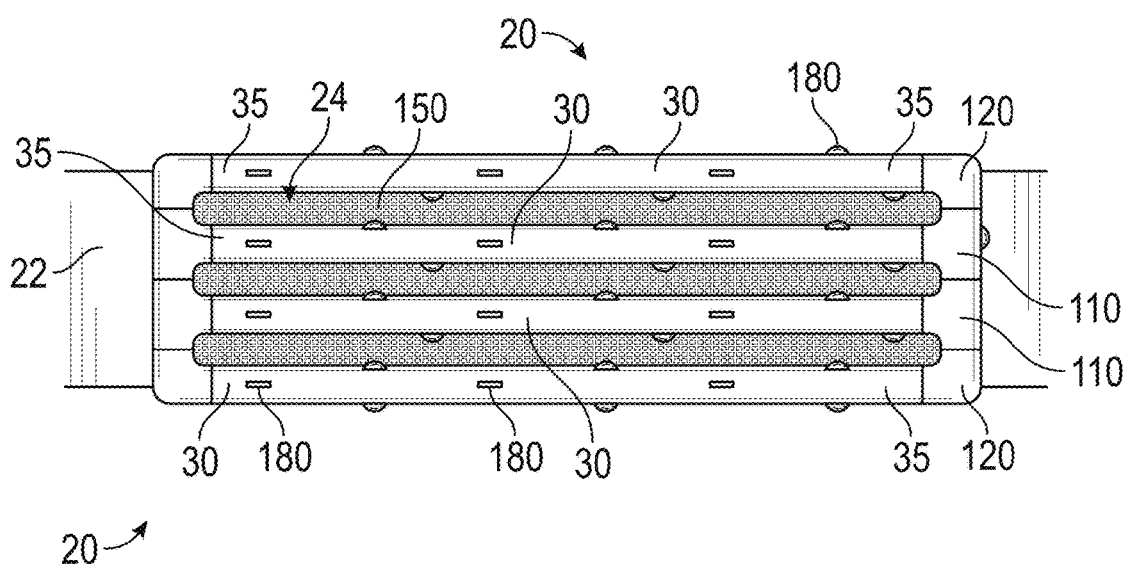
FIG. 1B is top view of the claimed invention in use on a spillway.
Figure 2A:
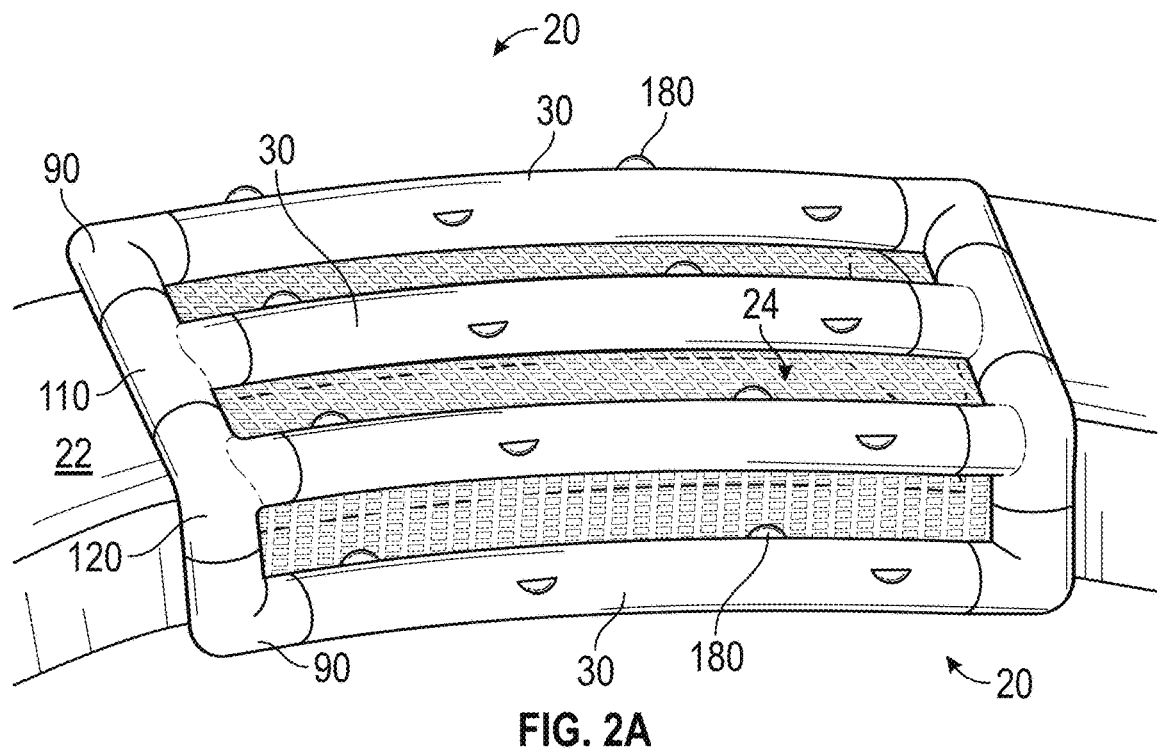
FIG. 2 is a perspective view of a variation of the invention.
Figure 2B:
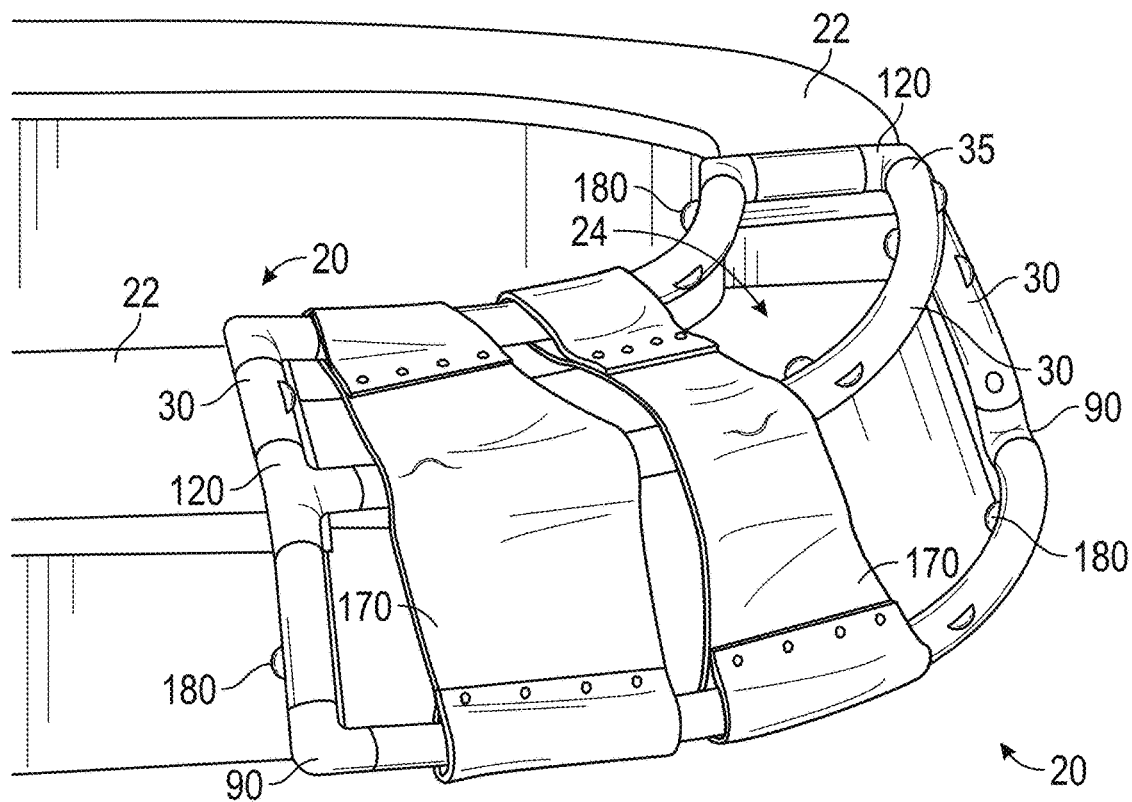
Figure 3:
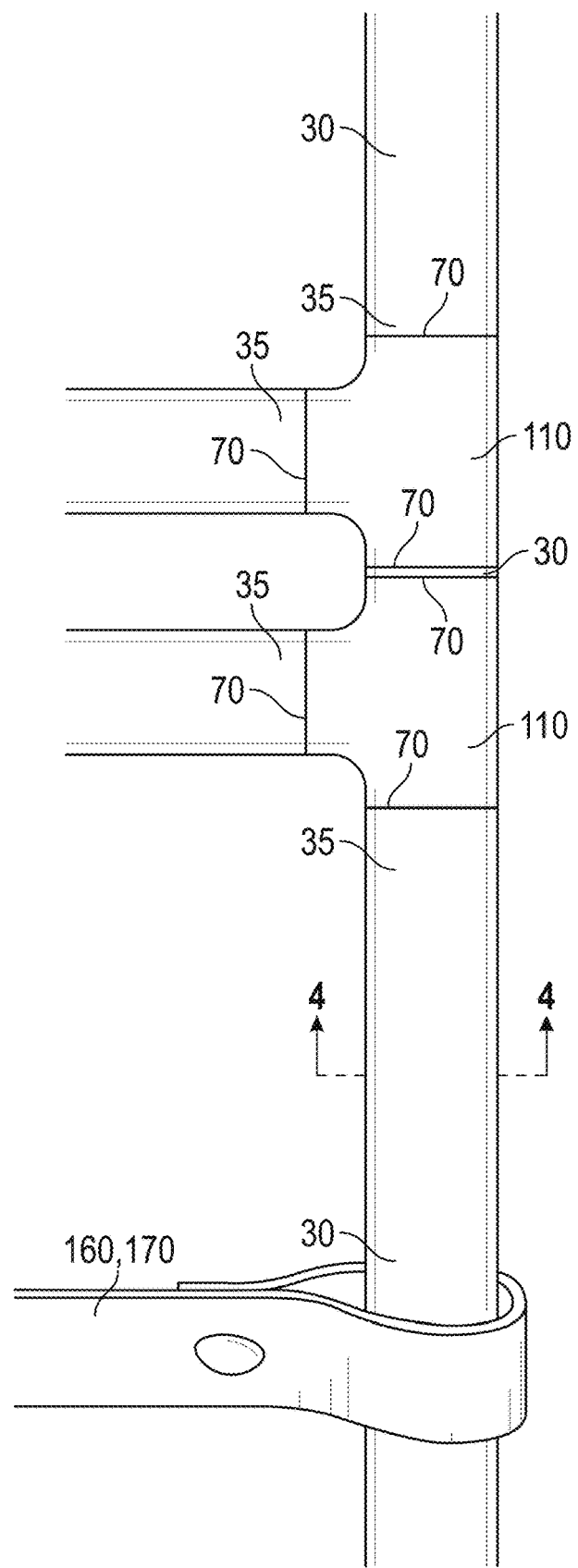
FIG. 3 is a partial front view of the invention, showing a pair of T-connectors of the invention.
Figure 4:
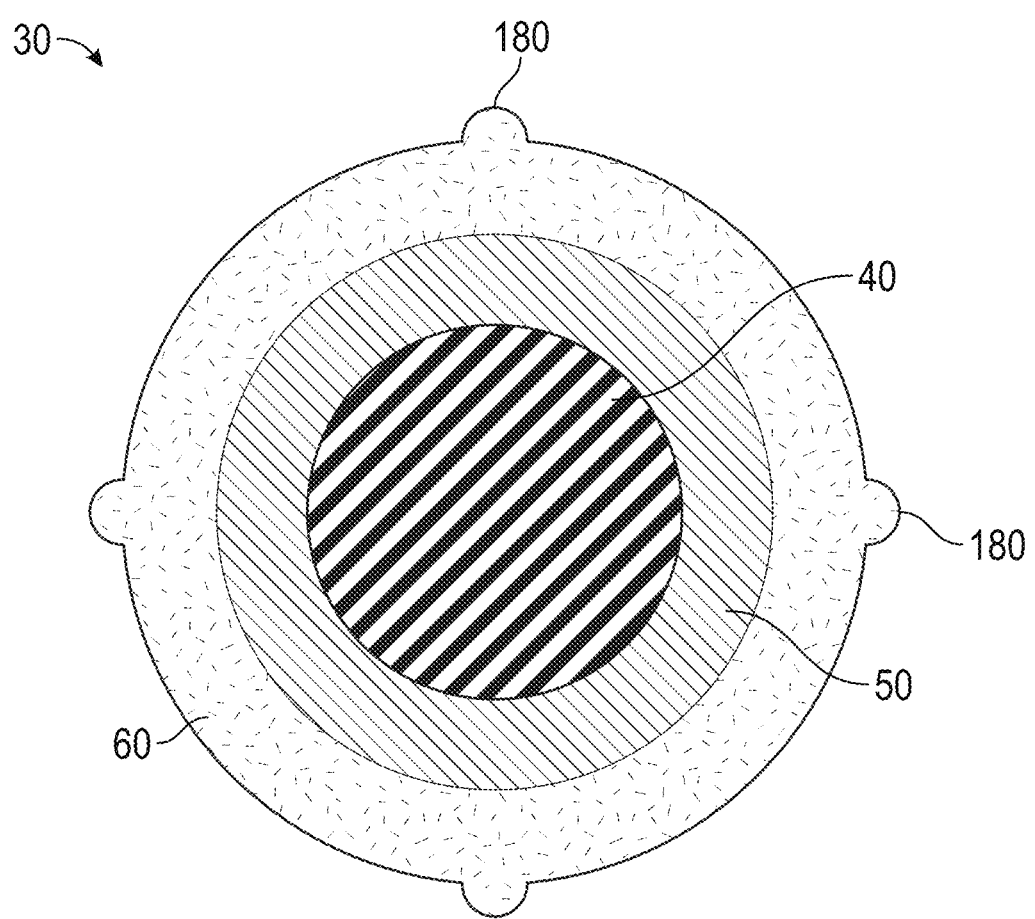
FIG. 4 is a cross-section view of an elongated frame member of the invention.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

FIGS. 1A-4 illustrate an animal barrier 10 for use proximate a body of water 20. The body of water 20 can be a pool water feature, a pond, a fountain, or any such body of water that a person may want to keep animals away from. Animals can include birds, rodents, or the like. In the case of the animal barrier 10 being used with the body of water 20 being a pool 20, the animal barrier 10 may sit upon a deck 22 and wrap around a spillway 24 on a pool deck, pool trim, fountain, hot tub, or other such water feature (FIGS. 1A, 1B, 2, and 11).

The animal barrier 10 is comprised of a plurality of elongated frame members 30, each having two opposing identical ends 35, a malleable inner core 40, a sleeve 50 surrounding the inner core, and a cushioning outer cover 60 (FIG. 4) having a plurality of protrusions 180 projecting laterally away therefrom. The malleable inner core 40 is preferably a malleable metal material, and the sleeve 50 and cushioning outer cover 60 are preferably made from materials that are resistant to damage when exposed to the elements, chlorinated water, and the like.

Figure 5:
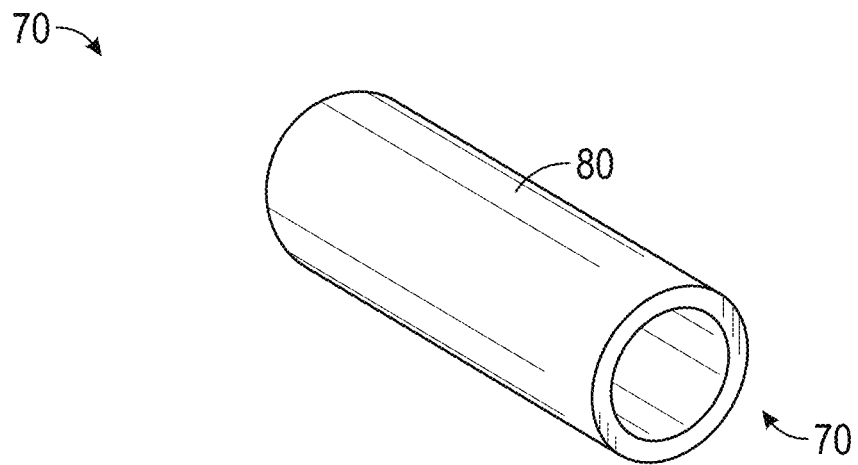
FIG. 5 is a perspective view of a union connector of the invention.
Figure 6:
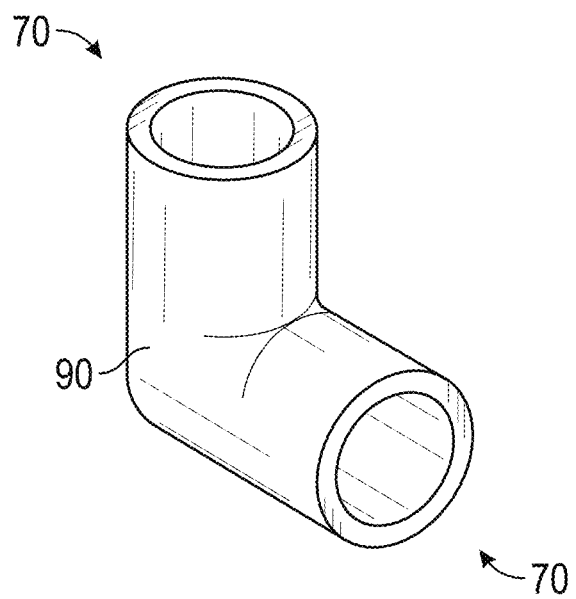
FIG. 6 is a perspective view of an L-connector of the invention.

The animal barrier 10 further includes a plurality of linear union connectors 80 (FIG. 5), each having identical, opposed open ends 70 and adapted to co-axially connect the ends of two of the elongated frame members 30. The animal barrier 10 further includes a plurality of L-connectors 90 (FIG. 6), each having two identical open ends 70, each end axially orthogonal to the other, and the L-connector 90 adapted to orthogonally connect the ends of two of the elongated frame members 30. The frame members 30 can be cut and put together to form a barrier frame 100 for fixing about the body of water 20, therefor forming the animal barrier 10 when the barrier frame 100 is placed about the body of water 20. The frame members 30, being malleable, can be bent to suit the shape of the body of water 20 and elements therearound.

Figure 7:
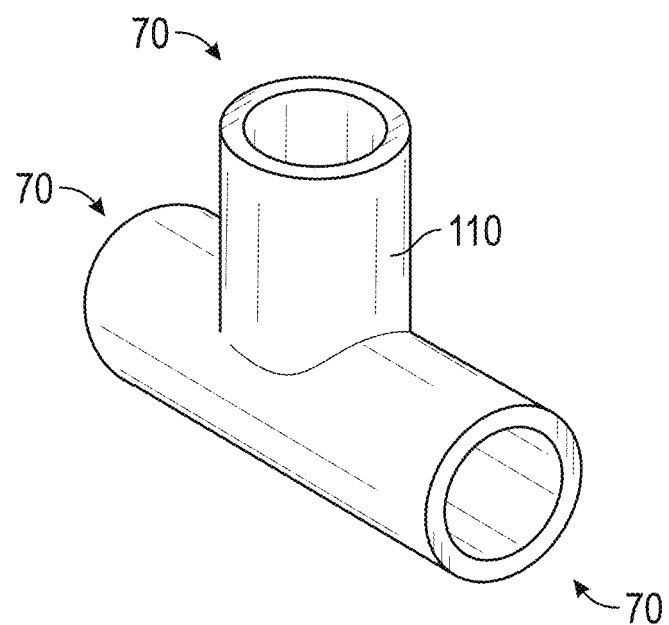
FIG. 7 is a perspective view of a T-connector of the invention.

A preferred embodiment of the animal barrier 10 further includes a plurality of T-connectors 110 (FIGS. 3 and 7), each having three identical open ends 70, and each end axially orthogonal to one of the others. The T-connector 110 is adapted to orthogonally or coaxially connect the ends of three of the elongated frame members 30.

Figure 8:
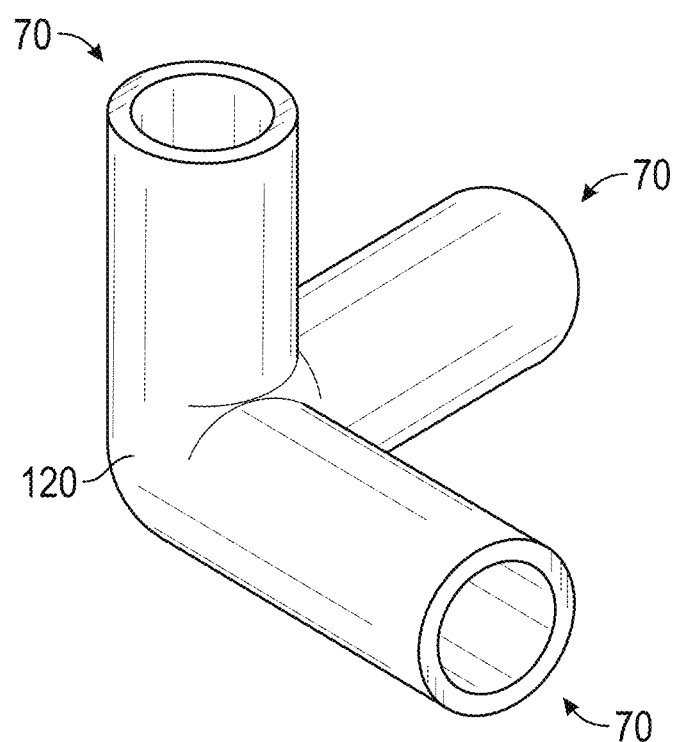
FIG. 8 is a perspective view of a corner connector of the invention.

The animal barrier 10 preferably further includes a plurality of corner connecters 120 (FIG. 8), each having three identical open ends 70, and each end axially orthogonal to all others open ends, and each corner connector 120 being adapted for connecting ends of three of the elongated frame members 30. This allows the elongated frame members 30 to be connected to form the barrier frame 100 as a structure that extends laterally, longitudinally, and vertically simultaneously.

Figure 9:
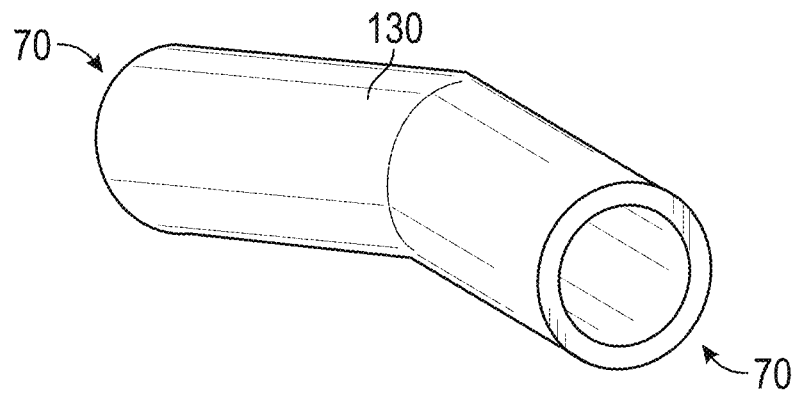
FIG. 9 is a perspective view of a 45-degree connector of the invention.
Figure 10:
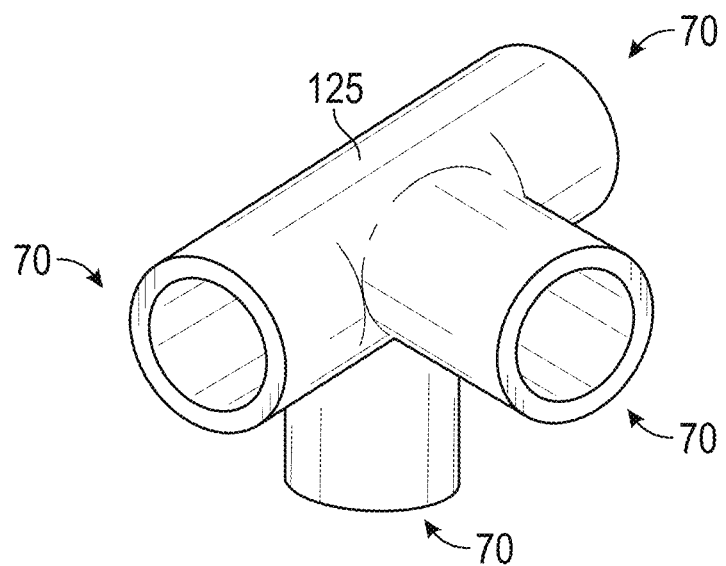
FIG. 10 is a perspective view of a 4-way connector of the invention.
Figure 11:
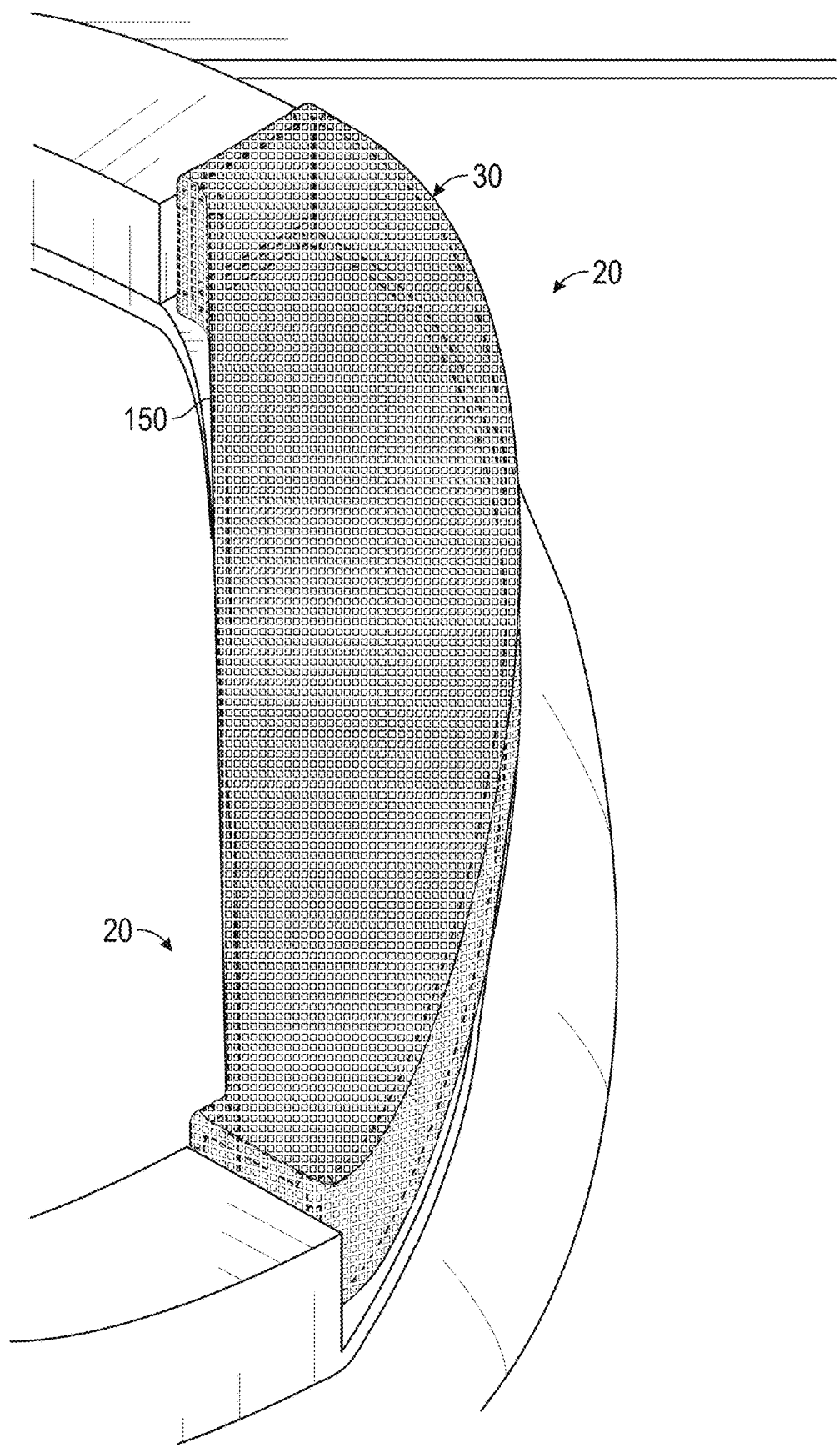
FIG. 11 a perspective view of another embodiment of the invention.

Further, the animal barrier 10 preferably includes a plurality of 45-degree connectors 130 (FIG. 9), each 45-degree connector 130 having two identical open ends 70 that form an angle $\alpha$ of 45-degrees, and each 45-degree connector 130 is adapted for connecting the ends of two of the elongated frame members 30. The animal barrier 10 may further include a plurality of 4-way connectors 125 (FIG. 10), each having four open ends 70, and each end axially orthogonal to all other open ends, each 4-way connector 125 being adapted for connecting ends of four of the elongated frame members 30. All of the connectors 80, 90, 110, 120, 130, and 125 are preferably made with a rigid PVC plastic material, and are resistant to damage caused by the sun and ultraviolet light exposure, chlorinated water exposure, or the like.

A preferred embodiment of the animal barrier 10 further includes a flexible web 150 adapted for fixing with two or more of the elongated frame members 30. The flexible web 150 is cut to conform to the elongated frame members 30 and held thereto at the protrusions 180 at least partially by friction, preventing animals from crossing through the barrier frame 100. The barrier 10 can be made of a malleable metallic mesh material, a resilient plastic mesh material, a vinyl sheet material 160, a foam sheet material 170, or any other such malleable or flexible material that is resistant to damage when exposed to the elements, chlorinated water, and the like.

The flexible web 150 can include a plurality of openings 155 through which any of the elongated frame members 30 may traverse to secure the mesh web 150 to the elongated frame members 30. The flexible web 150 may also include one part of a two part mechanical fastener (not shown), such as a hook and loop type fastener, a plurality of mesh loops with snaps which are designed to encircle and secure to the elongated frame members 30, or other such fastener. In one embodiment, illustrated in FIG. 11, the flexible web 150 is affixed over the barrier frame 100 and held thereon at least partially by friction between the flexible web 150 and the protrusions 180 of the elongated frame members 30.

While a particular form of the invention has been illustrated and described, it will be apparent that various modifications can be made without departing from the spirit and scope of the invention. For example, the flexible web does not have to be included for the animal barrier to still be utilized. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An animal barrier for use proximate a body of water, the animal barrier comprising:
   a plurality of elongated frame members each having two opposing identical ends, a malleable inner core, a sleeve surrounding the inner core, and a cushioning outer cover having a plurality of protrusions projecting laterally away therefrom;
   a plurality of linear union connectors, each having identical opposed open ends and adapted to co-axially connect either of the ends of any two of the plurality of elongated frame members;
   a plurality of L-connectors, each having two identical open ends, each end axially orthogonal to the other, the each L-connector adapted to orthogonally connect either of the ends of any two of the plurality of elongated frame members;
   a plurality of corner connectors, each having three identical open ends, each end axially orthogonal to all other open ends thereof, each corner connector adapted for connecting either of the ends of any three of the plurality of elongated frame members;
   a plurality of T-connectors, each having three identical open ends, each end axially orthogonal to one of the other open ends thereof, the each T-connector adapted to orthogonally or coaxially connect either of the ends of any three of the plurality of elongated frame members; and
   a flexible web adapted for fixing with two or more of the elongated frame members, the flexible web cut to conform to the elongated frame members and held thereto at the protrusions at least partially by friction;
   whereby the plurality of elongated frame members can be cut and put together to form a barrier frame for fixing about the body of water, the barrier frame placed about the body of water to form the animal barrier.

2. The animal barrier of claim 1 further including a plurality of 45-degree connectors, each 45-degree connector having two open ends that together form an angle of 45-degrees, each 45-degree connector adapted for connecting either of the ends of any two of the plurality of elongated frame members.

3. The animal barrier of claim 1 wherein the flexible web is a malleable metallic mesh material.

4. The animal barrier of claim 1 wherein the flexible web is a resilient plastic mesh material.

5. The animal barrier of claim 1 wherein the flexible web is a vinyl sheet material.

6. The animal barrier of claim 1 wherein the flexible web is a foam sheet material.

7. The animal barrier of claim 1 wherein the flexible web includes a plurality of openings through which any of the elongated frame members may traverse to secure the flexible web to the elongated frame members.

8. The animal barrier of claim 1 wherein the flexible web is affixed over the barrier frame.

9. An animal barrier for use proximate a body of water, the animal barrier comprising:
   to a plurality of elongated frame members each having two opposing identical ends, u a malleable inner core, a sleeve surrounding the inner core, and a cushioning outer cover having a plurality of protrusions projecting laterally away therefrom;
   a plurality of linear union connectors, each having identical opposed open ends and adapted to co-axially connect either of the ends of any two of the plurality of elongated frame members;
   a plurality of L-connectors, each having two identical open ends, each end axially orthogonal to the other, the each L-connector adapted to orthogonally connect either of the ends of any two of the plurality of elongated frame members;
   a plurality of corner connectors, each having three identical open ends, each end axially orthogonal to all each of the other the open ends thereof, each corner connector adapted for connecting either of the ends of any three of the plurality of elongated frame members; and
   a flexible web adapted for fixing with two or more of the elongated frame members, the flexible web cut to conform to the elongated frame members and held thereto at the protrusions at least partially by friction;
   whereby the plurality of frame members can be cut and put together to form a barrier frame for fixing about the body of water, the barrier frame placed about the body of water to form the animal barrier.

10. The animal barrier of claim 9 wherein the flexible web is a malleable metallic mesh material.

11. The animal barrier of claim 9 wherein the flexible web is a resilient plastic mesh material.

12. The animal barrier of claim 9 wherein the flexible web is a vinyl sheet material.

13. The animal barrier of claim 9 wherein the flexible web is a foam sheet material.

14. The animal barrier of claim 9 wherein the flexible web is affixed over the barrier frame.

* * * * *